United States Patent
Feldman et al.

(10) Patent No.: US 10,250,926 B2
(45) Date of Patent: Apr. 2, 2019

(54) TALLY MANAGEMENT SYSTEM FOR CLOUD-BASED VIDEO PRODUCTION

(71) Applicant: Disney Enterprises, Inc., Burbank, CA (US)

(72) Inventors: Vladislav Feldman, Manhasset Hills, NY (US); Michael J. Strein, Bohemia, NY (US); Efthimis Stefanidis, Douglaston, NY (US); Craig Beardsley, Chicago, IL (US)

(73) Assignee: Disney Enterprises, Inc., Burbank, CA (US)

( * ) Notice: Subject to any disclaimer, the term of this patent is extended or adjusted under 35 U.S.C. 154(b) by 54 days.

(21) Appl. No.: 15/462,503

(22) Filed: Mar. 17, 2017

(65) Prior Publication Data

US 2018/0270518 A1    Sep. 20, 2018

(51) Int. Cl.
| | | |
|---|---|---|
| *H04N 21/24* | (2011.01) | |
| *H04N 21/61* | (2011.01) | |
| *H04N 21/2665* | (2011.01) | |
| *H04N 21/218* | (2011.01) | |
| *H04N 21/236* | (2011.01) | |
| *H04N 21/643* | (2011.01) | |
| *H04N 21/84* | (2011.01) | |
| *H04N 5/262* | (2006.01) | |
| *H04N 5/268* | (2006.01) | |

(52) U.S. Cl.
CPC ......... *H04N 21/2407* (2013.01); *H04N 5/262* (2013.01); *H04N 5/268* (2013.01); *H04N 5/2624* (2013.01); *H04N 21/21805* (2013.01); *H04N 21/23614* (2013.01); *H04N 21/2665* (2013.01); *H04N 21/6175* (2013.01); *H04N 21/64322* (2013.01); *H04N 21/84* (2013.01)

(58) Field of Classification Search
None
See application file for complete search history.

(56) References Cited

U.S. PATENT DOCUMENTS

| | | | | |
|---|---|---|---|---|
| 2004/0255329 A1* | 12/2004 | Compton | ....... | H04N 21/234327 725/109 |
| 2008/0122986 A1* | 5/2008 | Diederichsen | ..... | H04N 21/2343 348/705 |

(Continued)

*Primary Examiner* — Omar S Parra
(74) *Attorney, Agent, or Firm* — Farjami & Farjami LLP

(57) ABSTRACT

According to one implementation, a tally management system includes a computing platform having a hardware processor and a system memory storing a tally management software code. The hardware processor executes the tally management software code to receive video production data identifying multiple video signals, and to map the video signals to corresponding video feed monitors for displaying the video signals. In addition, the hardware processor executes the tally management software code to receive selection data via a packet-switched network, the selection data identifying a primary monitor for displaying a video presentation, wherein a subset of the video signals contribute to the video presentation. The hardware processor further executes the tally management software to generate tally data identifying each of the video feed monitors corresponding respectively to the subset of video signals contributing to the video presentation, and to transmit the tally data via the packet-switched network.

20 Claims, 4 Drawing Sheets

(56) References Cited

U.S. PATENT DOCUMENTS

2016/0029052 A1* 1/2016 Pinks ............... H04N 21/23602
  725/109
2016/0353172 A1* 12/2016 Miller ................... G06F 3/0482

* cited by examiner

US 10,250,926 B2

TALLY MANAGEMENT SYSTEM FOR CLOUD-BASED VIDEO PRODUCTION

BACKGROUND

In a multi-source video production environment, local tally systems are often used to report back to the production personnel which video source is on air. Production personnel rely on the information provided from such tallies, which are typically displayed on a monitor wall that also displays the video sources. In complicated production environments, there may be many mix/effects layers, many key layers, and various other complex entry points that these tallies help keep production personnel, such as directors and producers, informed of.

Although video production workflows and the needs of production personnel have not changed significantly, video production processes that historically have consisted of many independent hardware components can now be accomplished virtually, on remote video production platforms. However, in such a distributed video production environment, it is presently not possible for production personnel to obtain local tally information for each of the video sources feeding into a remote video production platform.

SUMMARY

There are provided tally management systems and methods for cloud-based video production, substantially as shown in and/or described in connection with at least one of the figures, and as set forth more completely in the claims.

DETAILED DESCRIPTION

Figure 1:
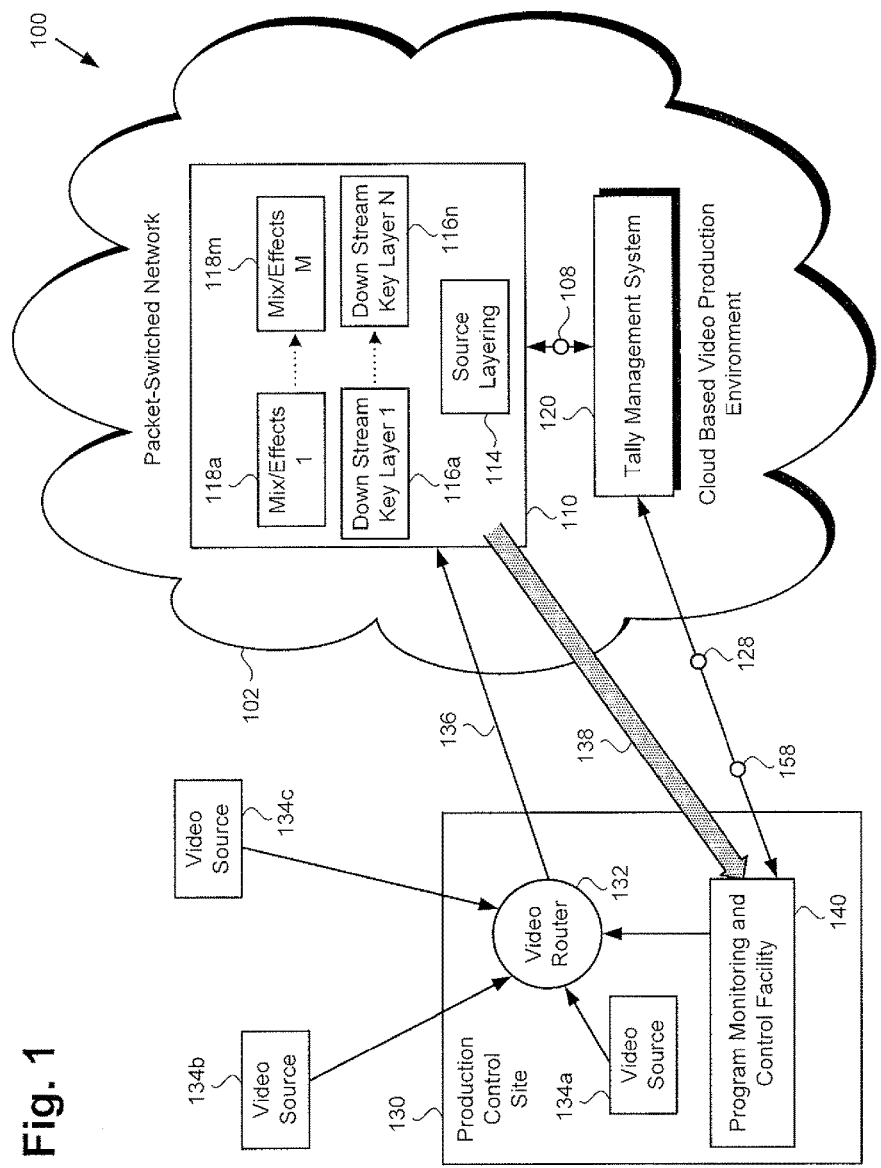
FIG. 1 shows a cloud-based video production environment including a tally management system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As described above, in a multi-source video production environment, local tally systems are often used to report back to the production personnel which video source is on air. It is noted that a tally is traditionally a bi-state conditional signal with an on or off state, often accomplished with a ground contact closure. Nevertheless, tallies can also include additional information, such as identifiers and/or status and/or logical position of video signals in a programming stream.

Production personnel rely on the information provided from these tallies, which are typically displayed on a monitor wall that also displays the video sources. In addition, operators of video source devices, such as remote cameras, for example, typically rely on tally information sent to their devices to inform them when video signals provided by their respective source devices are included in the current program presentation. In complicated production environments, there may be many mix/effects layers, many key layers, and various other complex entry points that these tallies help keep production personnel, such as directors and producers, informed of.

As further described above, although video production workflows and the needs of production personnel have not changed significantly, video production processes that historically have consisted of many independent hardware components can now be accomplished virtually, on remote video production platforms. However, in such a distributed video production environment, it is presently not possible for production personnel to obtain local tally information for each of the video sources feeding into a remote video production platform.

The present application discloses tally management systems and methods for cloud-based video production that address and overcome the deficiencies in the conventional art. For example, the present solution enables the mapping of video signals processed by a cloud-based video production system to corresponding video feed monitors that may be located in a remote production control facility. En addition, by generating tally data identifying the sources that are contributing to a video presentation, and transmitting the tally data to the production control facility via a packet-switched network, the present solution advantageously enables production personnel to obtain tally information for each of the video sources feeding into the cloud-based video production system.

FIG. 1 shows video production environment 100 including tally management system 120, according to one implementation. As shown in FIG. 1, video production environment 100 also includes cloud-based video production system 110, remote production control site 130, and packet-switched network 102 interactively linking tally management system 120, cloud-based video production system 110, and remote production control site 130. Also shown in FIG. 1 are remote video sources 134b and 134c, video stream 136, video production data 108, selection data 128, tally data 158, and programming stream 138.

As further shown in FIG. 1, remote production control site 130 includes program monitoring and control facility 140, video router 132, and local video source 134a. Video router 132, which may be implemented as a core switch of remote production control site 130, relays video content received from local video source 134a and/or remote video sources 134b and 134c to cloud-based video production system 110 as video stream 136.

Cloud-based video production system 110 includes source layering asset 114, multiple down stream key layers 116a through 116n, and multiple mix/effects layers 118a through 118m. It is noted that cloud-based video production system 110 may include one or more computing platforms, such as computer servers for example, which may be co-located in a data center, or may form an interactively linked but distributed system. As a result, source layering asset 114, multiple down stream key layers 116*a* through 116*n*, and multiple mix/effects layers 118*a* through 118*m* may correspond to distributed assets of cloud-based video production system 110 accessible via packet-switched network 102.

Cloud-based video production system 110 receives video stream 136 from remote production control site 130 and processes video stream 136 to produce programming stream 138. The video content received from local video source 134*a* and/or remote video sources 134*b* and 134*c*, and carried by video stream 136, may include ultra high-definition (ultra HD), HD, or standard-definition (SD) baseband video signals with embedded audio, captions, time code, and other ancillary metadata, such as ratings and/or parental guidelines.

Cloud-based video production system 110 provides programming stream 138 as an output to program monitoring and control facility 140 of remote production control site 130. Program monitoring and control facility 140 may be a video production control room, for example, for monitoring and editing programming stream 138. In addition to receiving programming stream 138 from cloud-based video production system 110, program monitoring and control facility is interactively linked to tally management system 120 via packet-switched network 102.

Tally management system 120 receives video production data 108 identifying the distinct video signal included in programming stream 138, from cloud-based video production system 110 via packet-switched network 102. Tally management system 120 receives selection data 128, via packet-switched network 102, from program monitoring and control facility 140. Selection data 128 identifies a primary monitor at program monitoring and control facility 140 for displaying a video presentation including a subset of the video signals carried by programming stream 138. Tally management system 120 transmits tally data 158, also via packet-switched network 102, to program monitoring and control facility 140. Tally data 158 enables video production personnel at program monitoring and control facility 140 to keep track of the video signals contributing to the video presentation displayed on the primary monitor at any given time.

Figure 2:
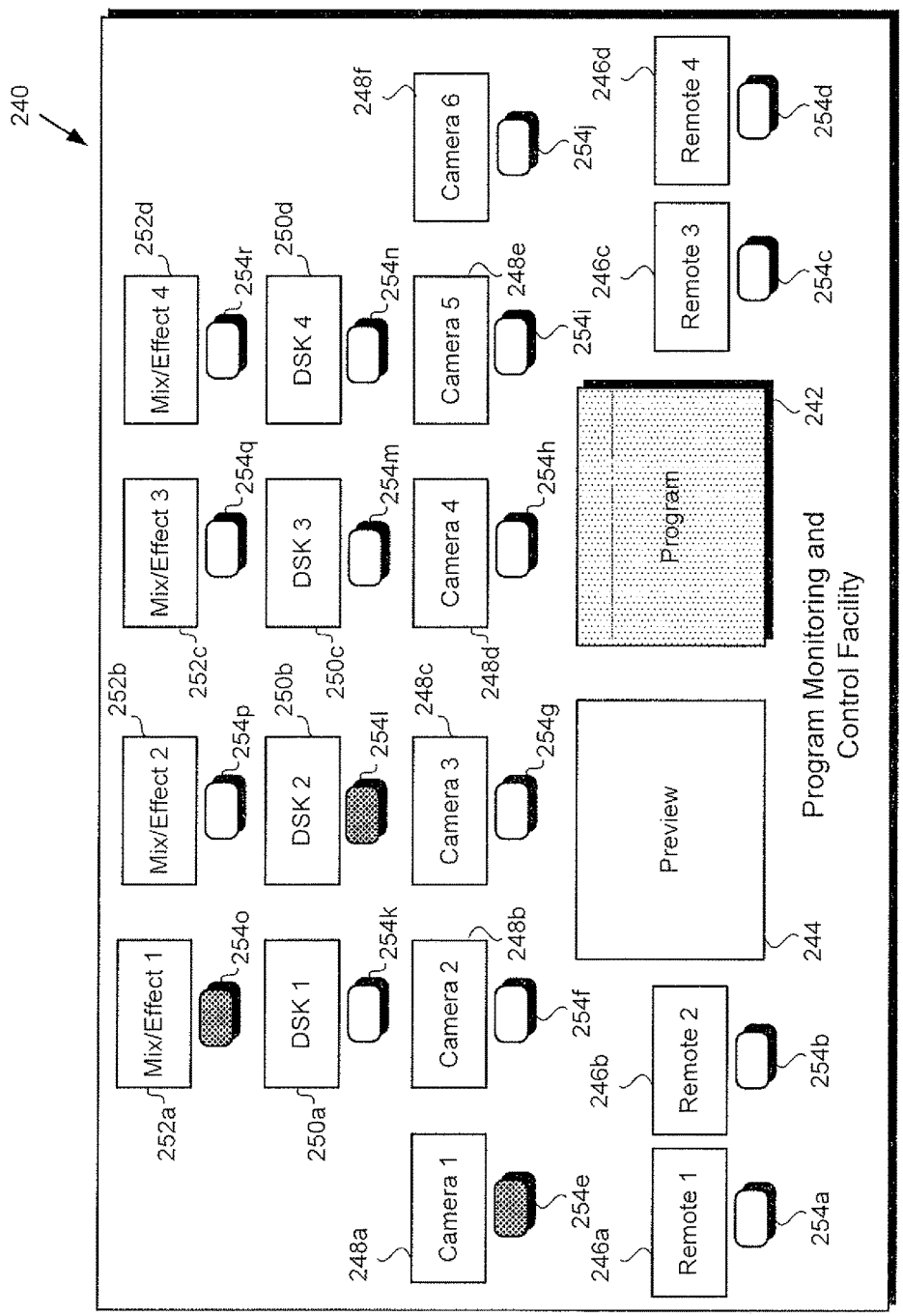
FIG. 2 shows a diagram of an exemplary program monitoring and control facility interactively linked to a tally management system for cloud-based video production, according to one implementation.

FIG. 2 shows a diagram of exemplary program monitoring and control facility 240 interactively linked to a tally management system for cloud-based video production, according to one implementation. As shown in FIG. 2, program monitoring and control facility 240 includes multiple monitors for displaying video content. For example, program monitoring and control facility 240 includes program monitor 242, preview monitor 244, and first, second, third, and fourth remote video feed monitors 246*a*, 246*b*, 246*c*, and 246*d* (hereinafter "remote monitors 246*a*-246*d*"). In addition, program monitoring and control facility 240 includes first, second, third, fourth, fifth, and sixth camera monitors 248*a*, 248*b*, 248*c*, 248*d*, 248*e*, and 248*f* (hereinafter "camera monitors 248*a*-248*f*").

Program monitoring and control facility 240 further includes first, second, third, and fourth down stream key monitors 250*a*, 250*b*, 250*c*, and 250*d* (hereinafter "down stream key monitors 250*a*-250*d*"), as well as first, second, third, and fourth mix/effect monitors 252*a*, 252*b*, 252*c*, and 252*d* (hereinafter "mix/effect monitors 252*a*-252*d*"). Also shown in FIG. 2 are tally indicators, shown as tally lights 254*a*, 254*b*, 254*c*, 254*d*, 254*e*, 254*f*, 254*g*, 254*h*, 254*i*, 254*j*, 254*k*, 254*l*, 254*m*, 254*n*, 254*o*, 254*p*, 254*q*, and 254*r* (hereinafter "tally lights 254*a*-254*r*").

Program monitoring and control facility 240 corresponds in general to program monitoring and control facility 140, in FIG. 1, and those corresponding features may share any of the characteristics attributed to either corresponding feature by the present disclosure. Thus, like program monitoring and control facility 240, program monitoring and control facility 140 may include program monitor 242, preview monitor 244, remote monitors 246*a*-246*d*, camera monitors 248*a*-248*f*, down stream key monitors 250*a*-250*d*, mix/effect monitors 252*a*-252*d*, and tally lights 254*a*-254*r*. Moreover, due to being situated at remote production control site 130, program monitor 242, preview monitor 244, remote monitors 246*a*-246*d*, camera monitors 248*a*-248*f*, down stream key monitors 250*a*-250*d*, mix/effect monitors 252*a*-252*d*, and tally lights 254*a*-254*r* are remote from tally management system 120.

Program monitor 242 displays a present programming stream being distributed by cloud-based video production system 110. That is to say, program monitor 242 displays content from programming stream 138 as it would be concurrently played out to audience members receiving the programming content. Preview monitor 244 displays a preview of content included in a programming stream being distributed by cloud-based video production system 110. In other words, preview monitor 244 displays content from programming stream 138 prior to its display on program monitor 242.

It is noted that, as defined in the present application, program monitor 242 and preview monitor 244 are primary monitors of program monitoring and control facility 140/240. Moreover, as defined in the present application, each of remote monitors 246*a*-246*d*, camera monitors 248*a*-248*f*, down stream key monitors 250*a*-250*d*, and mix/effect monitors 252*a*-252*d* are video feed monitors of program monitoring and control facility 140/240. It is further noted that each of remote monitors 246*a*-246*d*, camera monitors 248*a*-248*f*, down stream key monitors 250*a*-250*d*, and mix/effect monitors 252*a*-252*d* corresponds respectively to a video signal carried by programming stream 138.

Program monitor 242, preview monitor 244, remote monitors 246*a*-246*d*, camera monitors 248*a*-248*f*, down stream key monitors 250*a*-250*d*, and mix/effect monitors 252*a*-252*d* may take the form of liquid crystal display (LCD) monitors, light-emitting diode (LED) monitors, organic light-emitting diode (OLED) monitors, or another suitable display monitor that performs a physical transformation of signals to light.

According to the exemplary use case shown in FIG. 2, program monitor 242 is presently in use. In addition, and as shown in FIG. 2, tally lights 254*e*, 254*l*, and 254*o* are illuminated, while none other of tally lights 254*a*-254*r* is. Thus, according to the implementation of FIG. 2, program monitor 242 is displaying a video presentation to which only the video signals corresponding respectively to video feed monitors 248*a*, 250*b*, and 252*a* are contributing.

Furthermore, production personnel working in program monitoring and control facility 140/240 are kept informed of the respective contributions to the video presentation by the video signals corresponding to respective remote monitors 246*a*-246*d*, camera monitors 248*a*-248*f*, down stream key monitors 250*a*-250*d*, and mix/effect monitors 252*a*-252*d* in real-time through the illumination or extinguishment of respective tally lights 254*a*-254*r*. It is noted that, in addition to being illuminated or extinguished, tally lights 254*a*-254*r* can also include information, such as identifiers and/or status and/or logical position of the video signals corresponding respectively to remote monitors 246*a*-246*d*, camera monitors 248a-248f, down stream key monitors 250a-250d, and mix/effect monitors 252a-252d.

Figure 3:
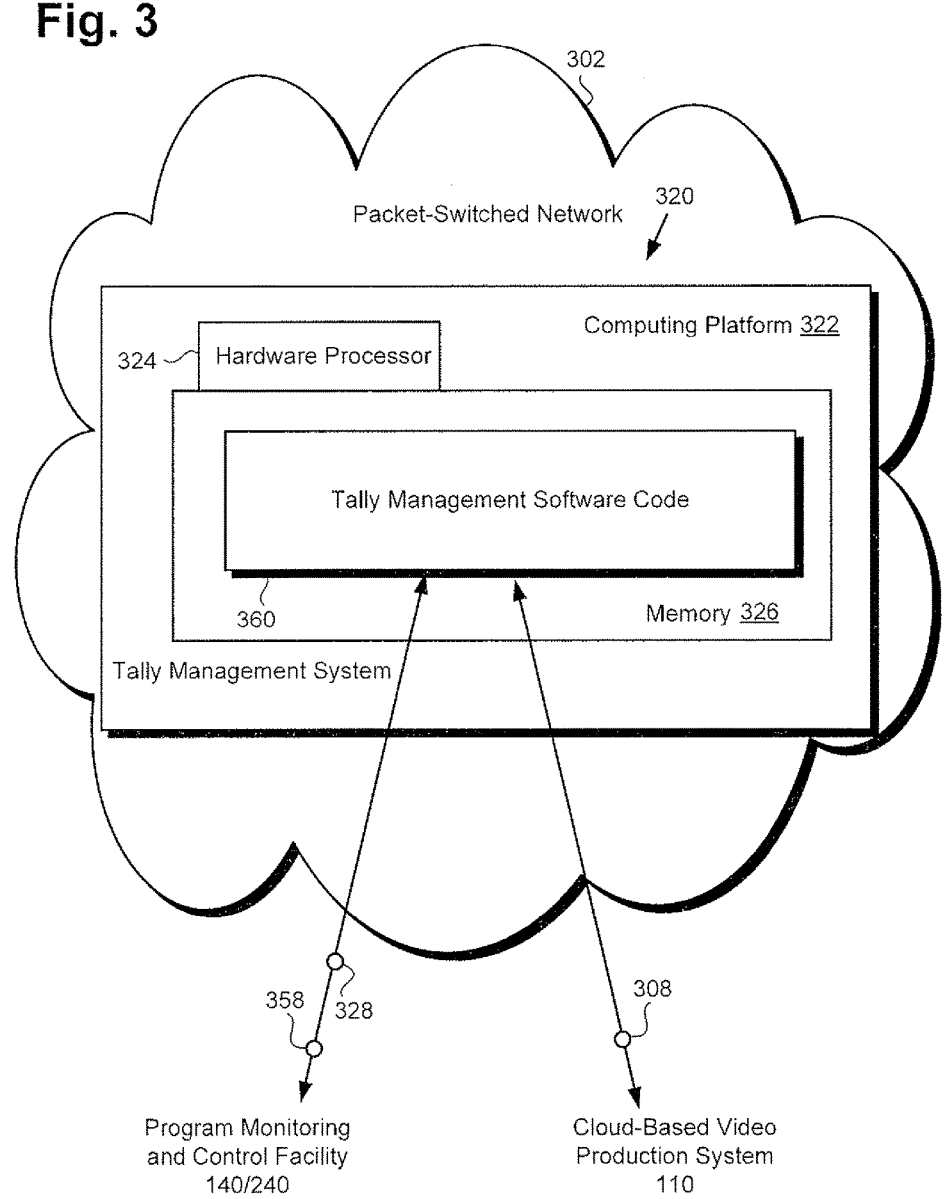
FIG. 3 shows an exemplary tally management system for cloud-based video production, according to one implementation.

FIG. 3 shows exemplary tally management system 320 for cloud-based video production, according to one implementation. As shown in FIG. 3, tally management system 320 includes computing platform 322 having hardware processor 324 and system memory 326. As further shown in FIG. 3, system memory 326 stores tally management software code 360. In addition, FIG. 3 shows packet-switched network 302 mediating communications between tally management system 320 and each of cloud-based video production system 110 and program monitoring and control facility 140/240. Also shown in FIG. 3 are video production data 308, selection data 328, and tally data 358. In other implementations, tally management may be implemented as a virtual machine in a computer platform, as software in a DSP (digital signal processor) incorporated another platform, or as a standalone software application.

Tally management system 320 corresponds in general to tally management system 120, in FIG. 1, and those corresponding features may share any of the characteristics attributed to either corresponding feature by the present disclosure. That is to say, like tally management system 320, tally management system 120 may include computing platform 322, hardware processor 324, and system memory 326 storing tally management software code 360.

It is noted that hardware processor 324 may be the central processing unit (CPU) for tally management system 120/320, for example, in which role hardware processor 324 executes tally management software code 360. It is further noted that video production data 308, selection data 328, and tally data 358, in FIG. 3, correspond respectively in general to video production data 108, selection data 128, and tally data 158, in FIG. 1, and those corresponding features may share the characteristics attributed to any corresponding feature by the present disclosure.

Figure 4:
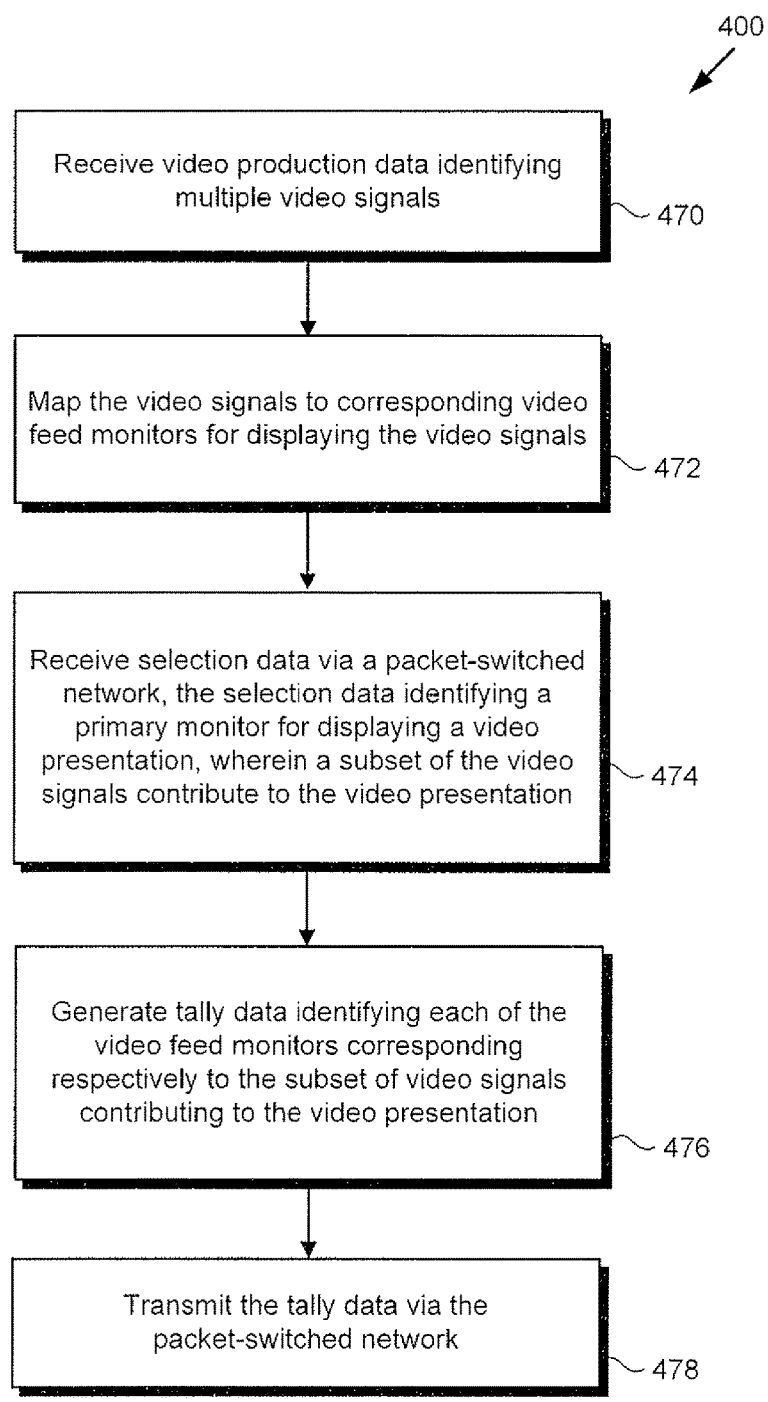
FIG. 4 shows a flowchart presenting an exemplary tally management method for cloud-based video production, according to one implementation.

The functionality of tally management software code 360 will be further described by reference to FIG. 4 in combination with FIGS. 1, 2, and 3. FIG. 4 shows flowchart 400 presenting an exemplary tally management method for cloud-based video production, according to one implementation.

Referring to FIG. 4 in combination with FIGS. 1, 2, and 3, flowchart 400 begins with receiving video production data 108/308 identifying multiple video signals (action 470). As discussed above, programming stream 138 produced by cloud-based video production system 110 may include several or many video signals. Video production data 108/308 includes the number of video signals carried by programming stream, as well as a unique identifier for each video signal. Video production data 108/308 may be received by tally management software code 360, executed by hardware processor 324.

Flowchart 400 continues with mapping the video signals identified by video production data 108/308 to corresponding video feed monitors for displaying the video signals (action 472). Referring to FIG. 2, each of the video signals carried by programming stream 138 may be mapped to a respective one of the video feed monitors of program monitoring and control facility 140/240, i.e., remote monitors 246a-246d, camera monitors 248a-248f, down stream key monitors 250a-250d, and mix/effect monitors 252a-252d. Mapping of each of the video signals carried by programming stream 138 and identified by video production data 108/308 to a respective one of remote monitors 246a-246d, camera monitors 248a-248f, down stream key monitors 250a-250d, and mix/effect monitors 252a-252d may be performed by tally management software code 360, executed by hardware processor 324.

Flowchart 400 continues with receiving selection data 128/328 via packet-switched network 102/302, selection data 128/328 identifying a primary monitor for displaying a video presentation, wherein a subset of the video signals carried by programming stream 138 contribute to the video presentation (action 474). Referring once again to FIG. 2, video production personnel working in program monitoring and control facility 140/240 may wish to observe the video content being presented on one of program monitor 242 or preview monitor 244, for example. According to the implementation shown in FIG. 2, program monitor 242 is selected for use, resulting in the video presentation displayed by program monitor 242 being viewed.

As noted above, tally management system 120/320 is interactively linked with program monitoring and control facility 140/240 via packet-switched network 102/302. Selection of program monitor 242 as the primary monitor for displaying the video presentation results in transfer of selection data 128/328 corresponding to the selection of program monitor 242 to tally management system 120/320. In addition to identifying program monitor 242 as the primary monitor presently in use, selection data 128/328 includes data and/or metadata identifying the video signals contributing to the video presentation being displayed on program monitor 242.

It is noted that selection data 128/328 is transferred from program monitoring and control facility 140/240 to tally management system 120/320 in a network communication mediated by packet-switched network 102/302. Moreover, and as further noted above, packet-switched network 102/302 may be the Internet. Thus, in some implementations, selection data 128/328 may be received in an Internet Protocol (IP) communication. Selection data 128/328 may be received via packet-switched network 102/302 by tally management software code 360, executed by hardware processor 324.

Flowchart 400 continues with generating tally data 158/358 identifying each of the video feed monitors corresponding respectively to the subset of video signals contributing to the video presentation (action 476). Upon receiving selection data 128/328 identifying program monitor 242 and the video signals contributing to the video presentation being displayed by program monitor 242, tally data 158/358 identifying which of remote monitors 246a-246d, camera monitors 248a-248f, down stream key monitors 250a-250d, and mix/effect monitors 252a-252d correspond respectively to those contributing video signals can be generated. For example, tally data 158/358 may be generated based on the mapping performed by tally management software code 360 in action 472.

Referring yet again to FIG. 2, according to the exemplary implementation shown in that figure, first camera monitor 248a, second down stream key monitor 250b, and first mix/effect monitor 252a are the video feed monitors corresponding respectively to the video signals contributing to the video presentation being displayed by the selected primary monitor, i.e., program monitor 242. As a result, tally data 158/358 may include command data for illuminating tally lights 254e, 254l, and 254o corresponding respectively to first camera monitor 248a, second down stream key monitor 250b, and first mix/effect monitor 252a. Moreover, in some implementations, tally data 158/358 may specify that any of tally lights 254a-254r other than tally lights 254e, 254l, and 254o that are presently illuminated be extinguished. Tally data 158/358 may be generated by tally management software code 360, executed by hardware processor 324.

Flowchart 400 can conclude with transmitting tally data 158/358 via packet-switched network 102/302, (action 478). As shown in FIGS. 1, 2, and 3, tally data 158/358 may be transmitted to program monitoring and control facility 140/240. As discussed above, tally data 158/358 provides instructions for illuminating tally lights 254e, 254l, and 254o. As a result, tally data 158/358 advantageously enables video production personnel working in program monitoring and control facility 140/240 to keep track of which video signals are presently contributing to the video presentation being displayed by program monitor 242.

Tally data 158/358 is transmitted by tally management system 120/320 to program monitoring and control facility 140/240 in a network communication mediated by packet-switched network 102/302. Moreover, and as further noted above, packet-switched network 102/302 may be the Internet. Thus, in some implementations, tally data 158/358 may be transmitted in an IP communication. Tally data 158/358 may be transmitted via packet-switched network 102/302 by tally management software code 360, executed by hardware processor 324.

It is noted that, in some implementations, and as shown by FIGS. 1 and 3, tally data 158/358 may be transmitted to program monitoring and control facility 140/240 out-of-band, i.e., as a communication separate from programming stream 138. However, in some implementations, it may be advantageous or desirable to transmit tally data 158/358 in-band, i.e., carded by programming stream 138. In those latter implementations, tally data 158/358 may be transmitted to cloud-based video production system 110 for further transmission to program monitoring and control facility 140/240 via programming stream 138.

Thus, the present application discloses tally management solutions that enable the mapping of video signals processed by a cloud-based video production system to corresponding video feed monitors that may be located in a remote production control facility. In addition, by generating tally data identifying the sources that are contributing to a video presentation, and transmitting the tally data to the production control facility via a packet-switched network, the present solution advantageously enables production personnel to obtain tally information for each of the video sources feeding into the cloud-based video production system.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A tally management system comprising:
a computing platform including a hardware processor and a system memory;
a tally management software code stored in the system memory;
the hardware processor configured to execute the tally management software code to:
receive a video production data identifying a plurality of video signals;
map each of the plurality of video signals to a corresponding one of a plurality of video feed monitors for displaying the plurality of video signals;
receive, from a remote production control facility, a selection data via a packet-switched network, the selection data identifying a primary monitor for displaying a video presentation, and the selection data further identifying a subset of the plurality of video signals contributing to the video presentation;
generate a tally data based on the mapping and the selection data to identify each of the plurality of video feed monitors corresponding respectively to the subset of the plurality of the video signals contributing to the video presentation; and
transmit the tally data to the remote production control facility via the packet-switched network, the tally data including command data for execution by the remote production control facility.

2. The tally management system of claim 1, wherein the video production data identifying the plurality of video signals is received via the packet-switched network.

3. The tally management system of claim 1, wherein the command data includes commands to illuminate one or more tally lights at the remote production control facility corresponding to one or more of the plurality of video feed monitors, respectively, and to extinguish other one or more tally lights at the remote production control facility corresponding to other one or more of the plurality of video feed monitors, respectively.

4. The tally management system of claim 1, wherein the selection data is received in an Internet Protocol (IP) communication.

5. The tally management system of claim 1, wherein the tally data transmitted in an IP communication.

6. The tally management system of claim 1, wherein the primary monitor for displaying the video presentation is remote from the tally management system.

7. The tally management system of claim 1, wherein the plurality of video feed monitors are remote from the tally management system.

8. The tally management system of claim 1, wherein the video production data identifying the plurality of video signals is received from a cloud-based video production system.

9. The tally management system of claim 8, wherein the primary monitor for displaying the video presentation displays a present programming stream being distributed by the cloud-based video production system.

10. The tally management system of claim 8, wherein the primary monitor for displaying the video presentation displays a preview of content included in a programming stream being distributed by the cloud-based video production system.

11. A method for use by a tally management system including a computing platform having a hardware processor and a system memory storing a tally management software code, the message comprising:
receiving, using the hardware processor, a video production data identifying a plurality of video signals;
mapping, using the hardware processor, each of the plurality of video signals to a corresponding one of a plurality of video feed monitors for displaying the plurality of video signals;
receiving, using the hardware processor from a remote production control facility, a selection data via a packet-switched network, the selection data identifying a primary monitor for displaying a video presentation, and the selection data further identifying a subset of the plurality of video signals contributing to the video presentation;

generating, using the hardware processor, a tally data based on the mapping and the selection data to identify each of the plurality of video feed monitors corresponding respectively to the subset of the plurality of the video signals contributing to the video presentation; and transmitting, using the hardware processor, the tally data to the remote production control facility via the packet-switched network, the tally data including command data for execution by the remote production control facility.

12. The method of claim 11, wherein the video production data identifying the plurality of video signals is received via the packet-switched network.

13. The method of claim 11, wherein the command data includes commands to illuminate one or more tally lights at the remote production control facility corresponding to one or more of the plurality of video feed monitors, respectively, and to extinguish other one or more tally lights at the remote production control facility corresponding to other one or more of the plurality of video feed monitors, respectively.

14. The method of claim 11, wherein the selection data is received in an Internet Protocol (IP) communication.

15. The method of claim 11, wherein the tally data transmitted in an IP communication.

16. The method of claim 11, wherein the primary monitor for displaying the video presentation is remote from the tally management system.

17. The method of claim 11, wherein the plurality of video feed monitors are remote from the tally management system.

18. The method of claim 11, wherein the video production data identifying the plurality of video signals is received from a cloud-based video production system.

19. The method of claim 18, wherein the primary monitor for displaying the video presentation displays a present programming stream being distributed by the cloud-based video production system.

20. The method of claim 18, wherein the primary monitor for displaying the video presentation displays a preview of content included in a programming stream being distributed by the cloud-based video production system.

* * * * *